Jan. 1, 1957
A. W. PHILLIPS
2,776,070
SELF-ALIGNING, SELF-VENTING HATCH COVER MEANS
Filed March 22, 1954
Fig. 1.
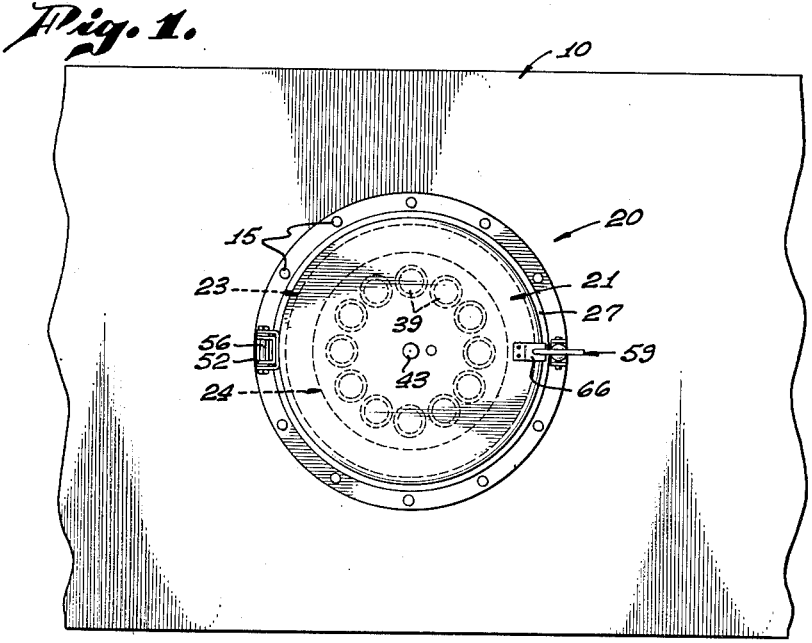
Fig. 2.
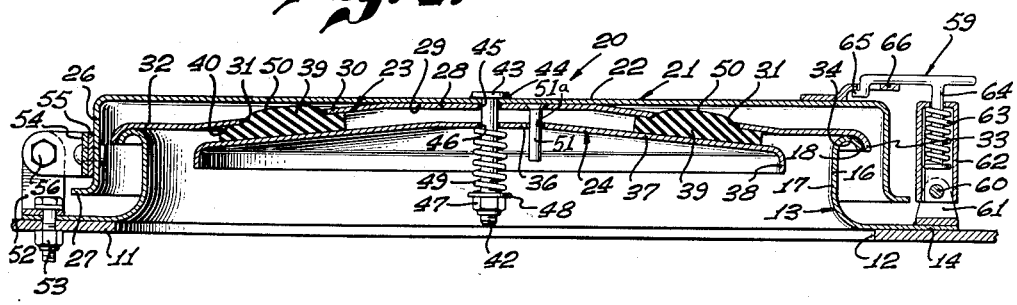
Fig. 3.
ALGER W. PHILLIPS,
INVENTOR.
BY
ATTORNEY.

United States Patent Office 2,776,070
Patented Jan. 1, 1957

2,776,070

SELF-ALIGNING, SELF-VENTING HATCH COVER MEANS

Alger W. Phillips, Pomona, Calif., assignor to Joe L. Cox

Application March 22, 1954, Serial No. 417,785

9 Claims. (Cl. 220—44)

This invention relates to a self-aligning, self-venting, weatherproof hatch means for storage receptacles or containers and more particularly to an improved lightweight hatch construction for vehicular hopper bodies for bulk material adapted to be unloaded from suitable valve means carried at the bottom of the hopper body.

Prior hopper bodies for railway cars and truck-trailer combinations and for transportation of dry, bulk, flowable materials have been provided with vents adjacent the upper portions of the hopper body for the purpose of preventing creation of a vacuum condition within the hopper body when unloaded through valve gate means carried at the bottom of the hopper body. Such prior vents have become clogged and closed so that in some instances when such a hopper body unloaded the discharge by gravity of the bulk material carried therewithin has caused collapse or inward distortion of the top wall portions of the hopper body because of the vacuum produced by displacement of said bulk material. Normally such hopper bodies have been provided with a top hatch opening through which the hopper body is filled and the creation of such a vacuum condition could be prevented by opening the hatch cover for said hatch opening. However, in practice this requires an additional operation for unloading, and during inclement weather opening of such a hatch is undesirable. As a result the hatches are usually not opened; and when the vents provided for the hopper body are closed, the hopper body is damaged by the vacuum condition created therewithin upon unloading of the bulk material.

In addition prior hatch covers for such hatch openings have been extremely heavy and usually made of cast metal. Such cast metal covers are brittle and subject to cracking when the hatch cover is forcibly thrown back into open position. In addition in hopper bodies which carry bulk cement there is a tendency for particles of cement to become lodged around the hatch opening so that the hatch cover when closed does not properly seat on a flange defining the hatch opening. Irregular formations of cement on the sealing edge of the hatch opening often creates undue stresses on the hatch cover when closed and secured so that the brittle cast metal construction of prior hatch covers may become damaged as by cracking.

This invention contemplates an improved hatch construction which obviates the disadvantages mentioned above and which is lightweight, self-aligning so as to provide an improved seal and which is self-venting so that upon unloading of a hopper body to which this improved hatch construction is applied the creation of a vacuum condition within the hopper body is positively prevented.

It is therefore the primary object of this invention to disclose and provide an improved hatch means for hopper bodies used in the storage and transportation of bulk flowable materials.

An object of this invention is to disclose and provide an improved hatch means which is weatherproof and which provides baffle means for sealing the hatch opening against entry of rain and other foreign matter.

Another object of this invention is to disclose and provide an improved hatch means which is automatically self-venting when a hopper body upon which the hatch means is provided is unloaded.

Still another object of this invention is to disclose and provide an improved hatch means wherein a hatch sealing member is mounted so as to properly align itself with the edge of an upstanding flange defining a hatch opening.

A further object of this invention is to disclose and provide an improved hatch means which is lightweight in construction, inexpensive to manufacture and which employs relatively flexible, elastic, nonbrittle material.

This invention contemplates an improved hatch means wherein air passageway means are provided for communication with vent means carried by said hatch means, said air passageways means being so designed as to prevent rain or other foreign matter from coming into contact with the vent means.

Generally speaking this invention contemplates a lightweight, self-aligning, self-venting, weatherproof hatch means wherein a plurality of interconnected hatch members are arranged in nested relation and are of progressively reduced size. The hatch members include an outer imperforate cover adapted to be secured and pivotally connected to the hopper body. Within the outer member is provided an intermediate sealing and venting member which is adapted to seat against an upstanding flange defining the hatch opening and which is spaced from the outer member except at its central portion, said central portion being normally seated against the inner surface of the outer member. An inner valve member is disposed within said intermediate member in normally spaced relation thereto and may be provided with resilient valve elements adapted to cover and close vent ports provided in the intermediate member, said inner valve member being biased by spring means into normally vent-closing relation. All of said members are interconnected by means whereby relative movement between said members is provided so that said intermediate member may readily align itself in proper seating relation with a flange defining the hatch opening, and said inner valve member may be moved relative to said intermediate member so that when bulk material is unloaded, the valve member is moved away from said intermediate member by suction to open the vent ports therein whereby a vacuum condition within the hopper body upon unloading is prevented.

These and other objects of this invention will be readily apparent from the following description of the drawings in which an exemplary embodiment of this invention is shown:

In the drawings:

Fig. 1 is a fragmentary top plan view of a hopper body having a hatch opening covered by a hatch means of this invention.

Fig. 2 is a sectional view of a hatch opening and hatch means embodying this invention, the section being taken in a vertical plane bisecting the device.

Fig. 3 is a sectional view of half the hatch means illustrating the hatch means in open venting position.

In Fig. 1 is shown a fragmentary top view of a hopper body 10 or tank providing a container or receptacle for storage of bulk flowable material. The hopper body 10 may be of well-known construction and is not illustrated in detail. It is understood that it may include side and end walls and converging wall portions leading to a bottom valve means whereby bulk material carried in said hopper body may be discharged by gravitational flow of said material therethrough.

A top wall 11 of the hopper body 10 may be provided with a circular opening 12. The margins of circular opening 12 support an annular hatch defining means 13 comprising an annular member 14 secured to the margins of the top wall about said opening 12 by any suitable means as by a plurality of spaced nut and bolt assemblies 15. The annular member 14 may extend inwardly to and slightly beyond opening 12 and is integral with an upstanding flange 16 defining hatch opening 17. The upstanding flange 16 may be provided with an outwardly and downwardly curled edge 18, the upper edge thereof providing a circular seating edge for hatch cover means generally indicated at 20.

The hatch cover means 20 comprises a plurality of coaxially arranged hatch members of progressively reduced diameter or size assembled in nested and relatively movable relation. An outer inverted, shallow cup-shaped hatch member 21 may include a circular imperforate cover plate portion 22 having a diameter greater than the diameters of an associated intermediate hatch member 23 and inner hatch valve member 24. The circular plate portion extends beyond upstanding flange 16 defining hatch opening 17 and is provided with a depending circumferential flange 26 having an outturned edge 27. The depending flange 26, when the hatch cover means is in position, is spaced radially outwardly from upstanding flange 16 and in concentric relation therewith.

The intermediate member 23 provides a sealing and venting means for hatch opening 17. The intermediate member 23 is formed with a diameter less than the diameter of the outer member 21 and is concentrically positioned within said outer member. The intermediate member 23 may comprise a central portion 28 adapted to seat against the central portion of plate 22 as at 29. Extending radially outwardly from the central portion 28 is an inclined portion 30 having a plurality of circularly spaced vent ports 31 therein. The inclined portion 30 terminates in a circumferential marginal portion 32 having a depending lip 33 adapted to enclose the outwardly curled edge 18 of upstanding flange 16. The marginal portion 32 provides on its outer surface a circular seating face 34 adjacent to the lip 33 and adapted to contact the top edge of upstanding flange 16.

It should be noted that the inclined portion 30 and the marginal portion 32 are spaced from the circular plate 22 and the depending flange 26. There is thus provided a baffled air passageway means encircling the upstanding flange 16 which communicates with vent ports 31. The baffles of said air passageway means comprise the outwardly and downwardly curled edge 18 of flange 16, the depending lip 33 of the intermediate member, and the depending flange 26 of outer member 21. Obviously foreign matter such as rain, dust and dirt is prevented from reaching the vent ports 31 because of the arrangement of the outer member 21, intermediate member 23, and upstanding flange 16.

Spaced from the intermediate member 23 is the inner valve member 24 which is provided a diameter substantially less than the diameter of the intermediate member and also substantially less than the diameter of hatch opening 17. The inner valve member 24 may be constructed somewhat similarly to the intermediate member 23 and may comprise an imperforate central portion 36 and an annular radially outwardly extending imperforate inclined portion 37 which terminates in a depending edge 38, the inclined portion 37 lying approximately opposite and parallel to the inclined portion 30 of the intermediate member. The inner valve member 36 carries a plurality of resilient valve elements 39 made of any suitable resilient, elastic, compressible material such as rubber, rubber compositions, and cellular plastic compositions. Each resilient valve element 39 may be secured to the inner surface of the inner member 24 as by cementing or bonding the resilient element thereto in any suitable manner. Each resilient element 39 is of sufficient size so that marginal portions thereof engage as at 40 margins of an associated vent port 31.

Means for interconnecting said hatch members 21, 23 and 24 to maintain said members in assembly and to afford relative movement therebetween may comprise a coaxially disposed bolt member 42 having a head 43 secured to the outer surface of the outer member as by welding at 44. The bolt member 42 extends through an opening in outer member 21 and through aligned openings 45 and 46 in the intermediate member 23 and inner member 24. The openings 45 and 46 provide a loose sliding fit with bolt 42. A nut 47 threaded on the end of bolt 42 may carry and support a circular spring seat element 48 in spaced relation to the opposed surface of inner member 24. A spring means 49, such as a coil spring, extends between said spring seat 48 and inner member 24 and may be placed under suitable compression as by turning of nut 47. The spring means 49 thus biases inner member 24 toward the intermediate member 23 and causes the resilient valve elements 39 to tightly seat against margins of the vent port 31 as at 40. The biasing pressure may be sufficiently great so as to cause partial extrusion of the resilient element 39 through the vent port as illustrated at 50. It will thus be readily apparent that the resilient valve elements 39 tightly seal said vent ports 31. A pin 51 secured to the intermediate member 23 extends downwardly through an opening 51a in the inner member 24 to restrain members 23 and 24 against relative rotation.

Means for connecting the hatch means 20 to the hatch defining means 13 may comprise a clevis arrangement provided by an upstanding U-shaped member 52 secured as by bolt and nut assemblies 53 to the annular member 14 and top wall 12 of the hopper body. The upstanding legs of the U-shaped member 52 may be received between legs of inner and outer horizontally arranged U-shaped members 54 and 55 secured as by bolt and nut assemblies 56 to the depending flange 26 of the outer member 21. The legs of said U-shaped members 52, 54 and 55 may be ported so as to receive pivot bolt assemblies 56. The hatch cover means may thus be lifted and pivoted to one side of the hatch opening 17 to permit filling of the hopper body.

Means for securing the hatch cover means 20 in closed position may comprise a biased latch means 59 pivotally connected at 60 to upstanding brackets 61 carried by the annular member 14. The latch means 59 may include a cylinder 62 housing a compression spring 63 which is seated at one end on an end flange of a latch element 64, the other end being seated on an end wall of the cylinder. Element 64 may have a hooked end 65 for engagement with a ported latch plate 66 secured to the outer member 21 in any suitable manner. In closed position the latch means 59 urges the hatch cover means downwardly into engagement with the flange 16 as more fully described later. The latch means may be simply released by lifting upwardly on the latch element 64 so as to disengage said element from the ported latch plate.

When the latch cover means is moved downwardly into closed position, the intermediate hatch member 23 is moved into seating and sealing engagement with the top edge of the upstanding flange 16. Because the intermediate member 23 is relatively movable with respect to the outer member 21 it will be readily apparent that the circular seating face 34 may adjust and align itself with the upper edge of flange 16 even though there may be slight irregularities in the seating edge and the outer member 21 is not identically positioned each time the hatch means is closed. Thus the intermediate member 23 is capable of self-alignment with respect to the edge of the upstanding flange 16 and a positive circular seal is provided.

In hatch closed position it should be noted that inner valve member 24 positively seals the vent ports 31, and even though the intermediate member has moved relative to the outer member the inner valve member is likewise capable of maintaining sealing relation with the intermediate member because the inner member is capable of relative movement with respect to the outer member and the intermediate member. Thus the vent ports 31 are positively sealed.

When a hopper body provided with the hatch cover means of this invention is unloaded by opening bottom valve means for gravity discharge of the flowable material, movement of said material downwardly normally creates a vacuum condition above the material and below the top of the hopper body. When the forces created by the vacuum condition exceed the forces exerted by the spring means 49, the inner valve member is drawn downwardly and air is admitted through the opened ports 31. Obviously the admission of such air destroys the vacuum condition and damage to the top wall of the hopper body is positively prevented. The inner valve member 24 is readily drawn downwardly by the suction forces because of the loose sliding fit with the bolt member 42.

It will thus be understood that a novel, self-aligning, self-venting, waterproof hatch construction is provided by the hatch cover means of this invention. The material of the hatch member and the hatch-defining means 13 is preferably made of a lightweight aluminum alloy which is capable of being fabricated by a spinning process. Such fabrication is very inexpensive, and the material is very lightweight yet resilient, elastic and strong. As a result the entire hatch construction of this invention is approximately one-fourth the weight of the usual hatch means of cast metal construction. While a spun-aluminum process is mentioned by way of example, it is understood that the hatch construction may be made by other methods and other suitable materials employed.

Although the hatch means of this invention discloses concentrically arranged nested circular members it is understood that the same principles of operation may be employed with hatch members of different configuration. The hatch construction of this invention may be substituted for present hatch constructions by securing to the hatch-defining means 13 a suitable ported plate of rectagular or square configuration to conform to the present square arrangement of such means on present hatch constructions. Obviously the hatch cover means 20 per se may be substituted for existing hatch cover means without disturbing the arrangement of the present hatch-defining means.

It is understood that various modifications and changes may be made in the hatch means described above which come within the spirit of this invention, and all such changes and modifications coming within the scope of the appended claims are embraced thereby.

I claim:

1. In a self-aligning, self-venting, weatherproof, hatch means for a hatch opening defined by an upstanding flange, the combination of: an outer inverted, shallow cup-shaped member including a circular imperforate cover plate provided with a depending circumferential flange having a diameter greater than the diameter of a hatch opening to be covered; an intermediate sealing and venting member coaxially aligned with said outer member and having a central portion adapted to adjustably seat against said cover plate and a circumferential marginal portion adapted to be spaced from said plate and said flange and an inclined portion connecting said central and marginal portions and provided with a plurality of spaced vent ports; said marginal portion having a depending lip adapted to enclose the upstanding flange of said hatch opening and a seating face for contact with the edge of said upstanding flange; an inner valve member spaced beneath said intermediate member and provided with a resilient valve element for closing each of said ports; and means for interconnecting all of said members and for biasing said resilient elements into sealing relation with margins of said vent ports, said interconnecting means comprising an axially disposed bolt fixed to said outer member and extending through aligned openings in said intermediate and valve members in loosely fitting relation, a spring seat element carried by said bolt in spaced relation to said inner valve member, spring means compressed between said spring seat element and said valve member for urging said valve member toward said intermediate member for normally closing said ports; and a pin carried by said intermediate member spaced from said bolt and extending through an opening in said inner member to limit relative rotation between said inner and intermediate members.

2. In a self-aligning, self-venting, weather-proof, hatch means for a hatch opening defined by an upstanding flange, the combination of: an outer inverted, shallow cup-shaped member including a circular imperforate cover plate provided with a depending circumferential flange having a diameter greater than the diameter of a hatch opening to be covered; an intermediate sealing and venting member aligned with said outer member and having a central portion adapted to adjustably seat against said cover plate and a circumferential marginal portion adapted to be spaced from said plate and said depending flange, said marginal portion providing a seating face adapted to contact the edge of said upstanding flange and having a depending lip adapted to encircle said upstanding flange; said intermediate member having a plurality of spaced vent ports; an inner valve member spaced from said intermediate member and provided with a resilient valve element for closing each of said ports; and means for interconnecting all of said members for limited relative movement therebetween and for biasing said resilient valve elements into sealing relation with margins of said vent ports, said interconnecting and said biasing means including a coaxially arranged element fixed to one of said members and slidably engaged by said two other members, and spring means carried by said coaxial element in contact with said valve member for urging said valve member toward said intermediate member.

3. In a self-aligning, self-venting weather-proof, hatch means for a hatch opening defined by an upstanding flange, the combination of: an outer circular imperforate member provided with a depending circumferential flange; an intermediate circular sealing and venting member adjustably positionable within said outer member and having a circumferential marginal portion adapted to be spaced from said outer member and said depending flange, said marginal portion providing a seating face and a depending lip adapted to engage and enclose respectively the upstanding flange of said hatch opening, said intermediate member having a vent port; an inner valve member spaced from and disposed within said intermediate member and provided with a resilient valve element for covering said vent port; and means fixed to said outer member and extending through openings in said intermediate and valve members and including spring means for holding said members in assembly and said valve member in vent-closing relation to said intermediate member.

4. A hatch means as defined in claim 3 wherein means are provided on said outer member for pivotally connecting said hatch means to a hopper body having said hatch opening.

5. In a hatch cover and vent means, the combination of: a plurality of circular members of progressively reduced diameter arranged in nested concentric relation and including an outer imperforate member provided with a circumferential flange, an intermediate ported member having a circumferential seating face and a circumferential lip adjacent said seating face spaced from said outer member, an inner circular member spaced from the intermediate member, a resilient valve element carried by said inner member for normally covering ports in said intermediate member; means interconnecting said nested members for limited relative movement therebetween including an element fixed to said outer member and coaxially extending through the intermediate and inner members in loosely fitting relation; and means carried by the intermediate member cooperably engaging said inner member for limiting relative rotation between the intermediate member and inner member.

6. A hatch cover and vent means as defined in claim 5 including spring means carried by said interconnecting means for biasing said intermediate and inner members into normally vent-sealing relation.

7. In a hatch cover and vent means, the combination of: a plurality of members of progressively reduced diameter arranged in nested relation on an axis and including an outer imperforate member provided with a circumferential flange, an intermediate ported member having a circumferential seating face and a circumferential lip adjacent said seating face spaced from said outer member, an inner member spaced from the intermediate member, a resilient valve element carried by said inner member for normally covering ports in said intermediate member; means interconnecting said nested members for limited axial relative movement therebetween; and means to limit relative rotation between said intermediate and inner members.

8. In a hatch cover and vent means, the combination of: a plurality of hatch members of progressively reduced size in nested arrangement on an axis and interconnected for relative movement therebetween along said axis; said plurality of members including an outer imperforate cover member; an intermediate vent perforated member having a seating face spaced from said outer member; and an inner valve member provided with valve elements for closing perforations in said perforated intermediate member; means for biasing said inner member into normally vent-sealing relation with said intermediate member; and means to limit relative rotation between said intermediate and inner members.

9. In a combined hatch cover and vent means, the combination of: an outer imperforate hatch member; an intermediate hatch member having portions spaced from said outer member and provided with vent ports and a seating face; an inner hatch member carrying resilient closure elements for said vent ports; means for holding said members in assembly in limited relative movable relation and including a bolt carried by the outer member and extending through the intermediate and inner members; and an element carried by the intermediate member spaced from said bolt and extending through an opening in said inner member.

References Cited in the file of this patent
UNITED STATES PATENTS

| | | |
|---|---|---|
| 439,040 | Ruscoe | Oct. 21, 1890 |
| 522,137 | Walker | June 26, 1894 |
| 1,550,213 | Hulsen et al. | Aug. 18, 1925 |
| 1,585,512 | Roades | May 18, 1926 |
| 2,452,612 | Swenberg | Nov. 2, 1948 |
| 2,487,454 | Lebus | Nov. 8, 1949 |
| 2,533,771 | De Frees | Dec. 12, 1950 |